United States Patent
Nguyen et al.

(10) Patent No.: US 10,013,024 B2
(45) Date of Patent: Jul. 3, 2018

(54) METHOD AND APPARATUS FOR INTERACTING WITH A HEAD MOUNTED DISPLAY

(71) Applicant: Nokia Technologies Oy, Espoo (FI)

(72) Inventors: David H. Nguyen, Sunnyvale, CA (US); Daniel L. Ashbrook, Sunnyvale, CA (US); Shigeyuki Seko, Campbell, CA (US)

(73) Assignee: Nokia Technologies Oy, Espoo (FI)

( * ) Notice: Subject to any disclaimer, the term of this patent is extended or adjusted under 35 U.S.C. 154(b) by 185 days.

(21) Appl. No.: 13/631,616

(22) Filed: Sep. 28, 2012

(65) Prior Publication Data

US 2014/0092029 A1    Apr. 3, 2014

(51) Int. Cl.
*G09G 1/00* (2006.01)
*G06F 1/16* (2006.01)

(52) U.S. Cl.
CPC .............. *G06F 1/163* (2013.01); *G06F 1/169* (2013.01)

(58) Field of Classification Search
CPC ... G02B 27/01; G02B 2021/0178; G06F 3/01; G06F 1/163
USPC ...................................... 345/8, 156
See application file for complete search history.

(56) References Cited

U.S. PATENT DOCUMENTS

| | | | |
|---|---|---|---|
| 2007/0052672 A1 | 3/2007 | Ritter et al. | |
| 2008/0159653 A1* | 7/2008 | Dunki-Jacobs et al. | 382/293 |
| 2010/0079356 A1 | 4/2010 | Hoellwarth | |
| 2010/0110368 A1 | 5/2010 | Chaum | |
| 2010/0321409 A1* | 12/2010 | Komori | G02B 27/017 345/656 |
| 2011/0194029 A1* | 8/2011 | Herrmann | G02B 27/017 348/569 |
| 2011/0213664 A1 | 9/2011 | Osterhout et al. | |
| 2013/0176626 A1* | 7/2013 | Heinrich | G02B 27/017 359/630 |

OTHER PUBLICATIONS

"Wearable Translation." [retrieved Sep. 28, 2017]. Retrieved via the Internet Archive Wayback Machine at <URL: https://web.archive.org/web/20060312022643/http://igargoyle.com/archives/2005/11/wearable_transl.html>. (dated Nov. 8, 2005); 2 pages.

(Continued)

*Primary Examiner* — Michael Faragalla
(74) *Attorney, Agent, or Firm* — Alston & Bird LLP

(57) ABSTRACT

A method, apparatus and computer program product are provided to permit a user to interact with a head mounted display, such as with the information presented upon a head mounted display. In the context of a method, a first input is received from a first touch sensor positioned upon a first portion of a head mounted display. The method also receives a second input from a second touch sensor positioned upon a second portion of the head mounted display. The second portion of the head mounted display is configured to be opposite the first portion relative to a user's head. The method also includes causing performance of an operation related to the head mounted display based upon a combination of both the first and second inputs.

20 Claims, 5 Drawing Sheets

(56) References Cited

OTHER PUBLICATIONS

"Google to Sell Controversial AR Heads-Up-Display (HUD) Glasses by Year-End, Raises Huge Privacy Concerns." [retrieved Sep. 28, 2017]. Retrieved from the Internet: <URL: http://tommytoy.typepad.com/tommy-toy-pbt-consultin/2012/02/google-to-sell-controversial-augmented-reality-heads-up-display-hud-glasses-by-year-end-raises-huge-.html>. (dated Feb. 23, 2012); 6 pages.
Buil, Vincent et al. "Touch Headphones: An Example of Ambient Intelligence." ACM Symposium on User Interface Software and Technology (UIST) 2006 Adjunct Proceedings: Sponsor Demonstrations; Montreaux, Switzerland; Oct. 15-18, 2006; 1 page.

\* cited by examiner

METHOD AND APPARATUS FOR INTERACTING WITH A HEAD MOUNTED DISPLAY

TECHNOLOGICAL FIELD

An example embodiment of the present invention relates generally to head mounted displays and, more particularly, to interaction with a head mounted display.

BACKGROUND

Head mounted displays permit a user to view their surroundings through the head mounted display, while concurrently permitting information to be presented upon the head mounted display. As a result of the information that is presented thereupon, a head mounted display may provide for an augmented view of the user's surroundings. The information that is presented upon the head mounted display may vary widely and may, in some instances, be associated with one or more objects, e.g., one or more buildings, one or more people, one or more roads, etc., that are viewed through the head mounted display, thereby enhancing the user experience.

The user may desire to interact with the head mounted display, such as by interacting with the information provided via the head mounted display. For example, a user may wish to modify the information, obtain additional information, make a selection, perform a particular function, such as by capturing an image, etc. In this regard, a user may provide input to the head mounted display so as to perform a discrete operation, such as to control the playing of a content file, e.g., by playing, pausing, stopping, fast forward, reversing, etc. a video or audio file.

A user may provide input to a head mounted display via a controller or other input device that is physically remote from the head mounted display, but is in communication therewith. For example, a user may utilize a controller, e.g., a joystick controller, or another device, such as a cellular telephone, that is configured to communicate with the head mounted display in order to provide input to the head mounted display. However, the discrete operations that may be controlled in this fashion may be somewhat limited and, as a result, may not provide for rich interaction with the head mounted display and, more particularly, with the information presented by the head mounted display. Moreover, a user is required in these instances to carry the additional device or controller in order to provide the input to the head mounted display.

BRIEF SUMMARY

A method, apparatus and computer program product are provided according to an example embodiment of the present invention in order to permit a user to interact more richly with a head mounted display, such as with the information presented upon a head mounted display. In one embodiment, the method, apparatus and computer program product facilitate user interaction with a head mounted display without requiring the user to carry an additional device or controller via which to provide the input. Further, the method, apparatus and computer program product of one embodiment may receive first and second inputs via first and second portions of the head mounted display that are positioned on opposite sides of the user's head with the first and second inputs being relatively intuitive so as to facilitate user interaction.

In one embodiment, a method is provided that includes receiving a first input from a first touch sensor positioned upon a first portion of a head mounted display. The method also receives a second input from a second touch sensor positioned upon a second portion of the head mounted display. The second portion of the head mounted display is configured to be opposite the first portion relative to a user's head. The method also includes causing, with a processor, performance of an operation related to the head mounted display based upon a combination of both the first and second inputs.

The receipt of the first input and/or the receipt of the second input may include receiving an input representative of a continuous movement along the respective portion of the head mounted display. In one embodiment, the method may receive the first input by receiving an input representative of a continuous movement in a first direction along the first portion of the head mounted display. Similarly, the receipt of the second input of this embodiment may include receiving an input representative of a continuous movement in the first direction along the second portion of the head mounted display. Based upon a combination of the first and second inputs, the method of this embodiment may cause an image that is presented by the head mounted display to be zoomed.

The method of one embodiment may receive the first input by receiving an input representative of a continuous movement in a first direction along the first portion of the head mounted display. The method of this embodiment may receive the second input by receiving an input representative of a continuous movement in the second direction, opposite the first direction, along the second portion of the head mounted display. In response, the method may cause rotation of an image presented by the head mount display. In another embodiment, the method may receive the first input by receiving an input representative of a stationary selection on the first portion of the head mounted display. The method of this embodiment may also receive the second input by receiving an input representative of a continuous movement along the second portion the head mounted display. As such, the method this embodiment may cause rotation of an image presented by the head mounted display.

In one embodiment, the method may cause deformation of an image presented by the head mounted display based upon a combination of the first and second inputs. In this embodiment, the method may cause deformation of the image presented by the head mounted display by modifying one portion of the image based upon the first input and modifying another portion the image based upon the second input.

In another embodiment, an apparatus is provided that includes at least one processor and at least one memory including computer program code with the at least one memory and the computer program code configured to, with the processor, cause the apparatus to at least receive the first input from a first touch sensor positioned upon a first portion of the head mounted display. The at least one memory and the computer program code are configured to, with the processor, cause the apparatus to receive a second input from a second touch sensor positioned upon a second portion of the head mounted display. The second portion of the head mounted display is configured to be opposite the first portion relative to a user's head. The at least one memory and the computer program code are also configured to, with the processor, cause the apparatus to cause performance of an operation related to the head mounted display based upon a combination of both the first and second inputs.

The at least one memory and the computer program code may be configured to, with the processor, cause the apparatus of one embodiment to receive the first input and/or to receive the second input by receiving an input representative of continuous movement along the respective portion of the head mounted display. The at least one memory and the computer code are configured to, with the processor, cause the apparatus of one embodiment to receive the first input by receiving input representative of a continuous movement in a first direction along the first portion of the head mounted display, to receive the second input by receiving an input representative of a continuous movement in the first direction along the second portion of the head mounted display and to cause performance of an operation by causing rotation of an image presented by the head mounted display.

The at least one memory and the computer program code are configured to, with the processor, cause the apparatus of one embodiment to receive the first input by receiving an input representative of a continuous movement in the first direction on the first portion of the head mounted display, to receive the second input by receiving input representative of a continuous movement in the second direction, opposite the first direction, along the second portion of the head mounted display and to cause performance of an operation by causing rotation of an image presented by the head mounted display. The at least one memory and the computer program are also configured to, with the processor, cause the apparatus of one embodiment to receive the first input by receiving an input representative of a stationary selection on the first portion of the head mounted display, to receive the second input by receiving an input representative of a continuous movement along the second portion of the head mounted display and to cause performance of an operation by causing rotation of an image presented by the head mounted display.

The at least one memory and the computer program code are configured to, with the processor, cause the apparatus of one embodiment to cause performance of an operation by causing deformation of an image presented by the head mounted display based upon the combination both the first and second inputs. The at least one memory and the computer program code are configured to, with the processor, cause the apparatus of this embodiment to cause deformation to the image presented by the head mounted display by modifying one portion of the image based upon the first input and modifying another portion of the image based upon the second input.

In a further embodiment, a computer program product is provided that includes at least one non-transitory computer-readable storage medium having computer-executable program code portions stored therein with the computer-executable program code portions including program code instructions for receiving a first input from a first touch sensor positioned upon a first portion of a head mounted display. The computer-executable program code portions also include program code instructions for receiving a second input from a second touch sensor positioned upon the second portion of the head mounted display. The second portion of the head mounted display is configured to be opposite the first portion relative to a user's head. The computer-executable program code portions also include program code instructions for causing performance of an operation related to the head mounted display based upon a combination of both the first and second inputs.

At least one of the program code instructions for receiving a first input and/or the program code instructions for receiving the second input may include program code instructions for receiving an input representative of a continuous movement along a respective portion of the head mounted display. The program code instructions for receiving the first input may include program code instruction for receiving an input representative of a continuous movement in a first direction along the first portion of the head mounted display. Similarly, the program code instructions for receiving the second input may include program code instructions for receiving an input representative of a continuous movement for the first direction along the second portion of the head mounted display. In this embodiment, the program code instructions for causing performance of an operation may include program code instructions for causing zooming of an image presented by the head mounted display.

The program code instructions for receiving the first input in accordance with one embodiment may include program code instructions for receiving an input representative of continuous movement in the first direction on the first portion of the head mounted display. In this embodiment, the program code instructions for receiving the second input may include program code instructions for receiving an input representative of continuous movement in a second direction, opposite the first direction, among the second portion of the head mounted display. In this embodiment, the program code instructions for causing performance of an operation may include program code instructions for causing rotation for an image presented by the head mounted display.

The program code instructions for receiving the first input in accordance with one embodiment may include program code instructions for receiving an input representative of a stationary selection on the first portion of the head mounted display. In this embodiment, the program code instructions for receiving the second input may include program code instructions for receiving an input representative of a continuous movement along the second portion of the head mounted display. In this embodiment, the program code instructions were causing performance of an operation may include program code instructions for causing rotation of an image presented by the head mounted display. In another embodiment, the program code instructions for causing performance of an operation may include program code instructions for causing deformation of an image presented by the head mounted display based upon the combination of the first and second inputs.

In yet another embodiment, an apparatus provided that includes means for receiving a first input from a first touch sensor positioned on the first portion of the head mounted display. The apparatus of this embodiment also includes means for receiving a second input from a second touch sensor positioned upon a second portion of head mounted display. The second portion of the head mounted display is configured to be opposite of the first portion relative to a user's head. The apparatus also includes means for causing performance of an operation related to the head mounted display based on a combination both the first and second inputs.

BRIEF DESCRIPTION OF THE DRAWINGS

Figure 1:
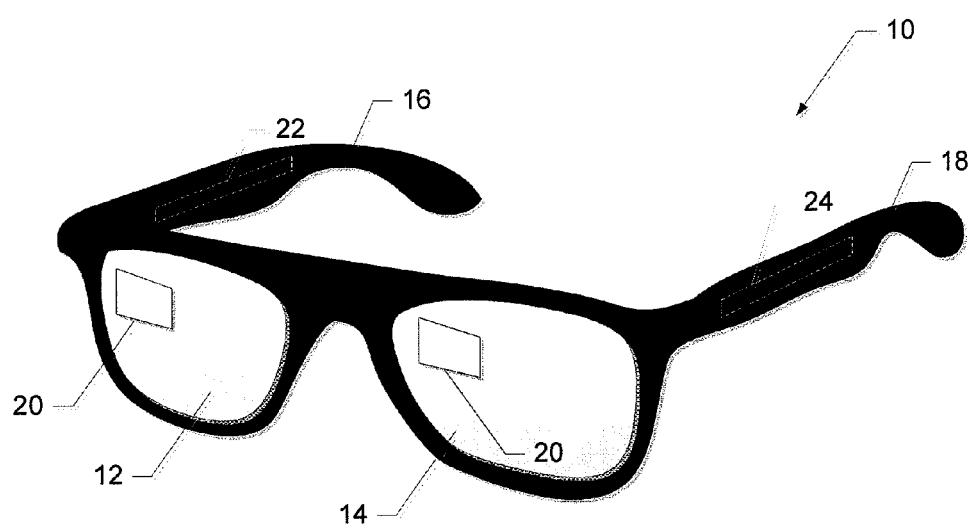
Figure 2:
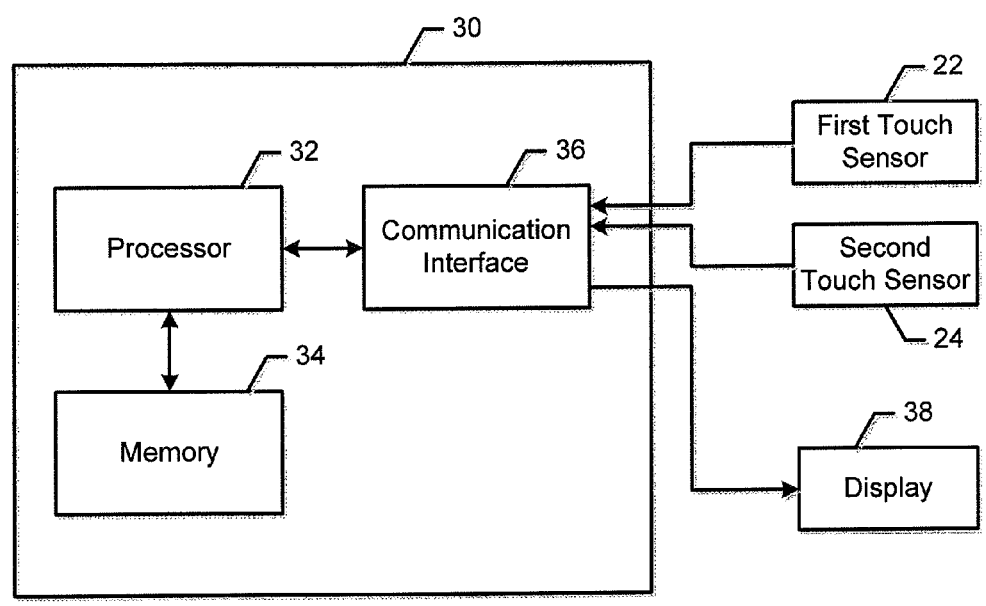
Figure 3:
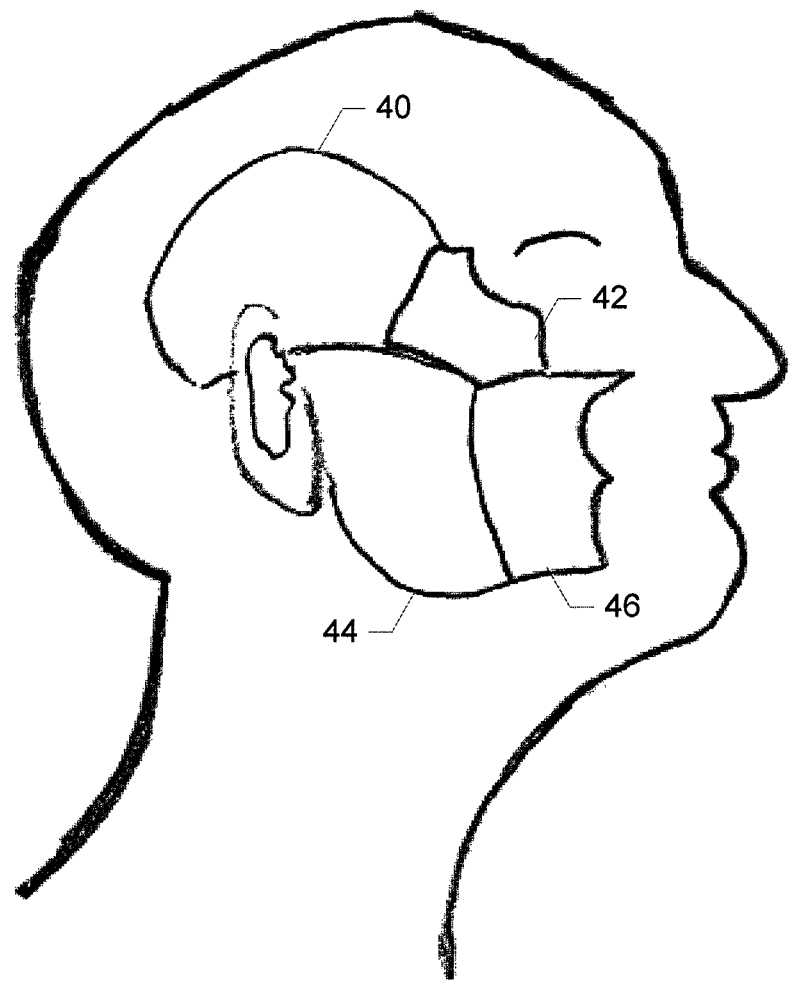
Figure 4:
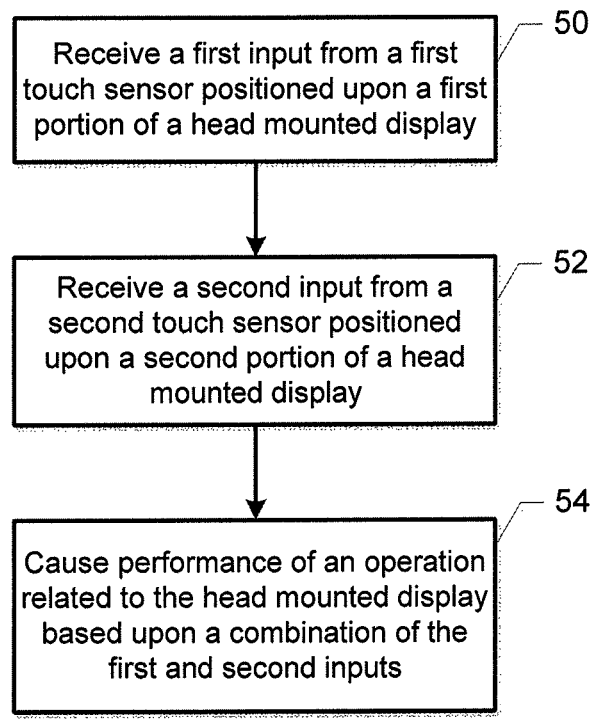
Figure 5:
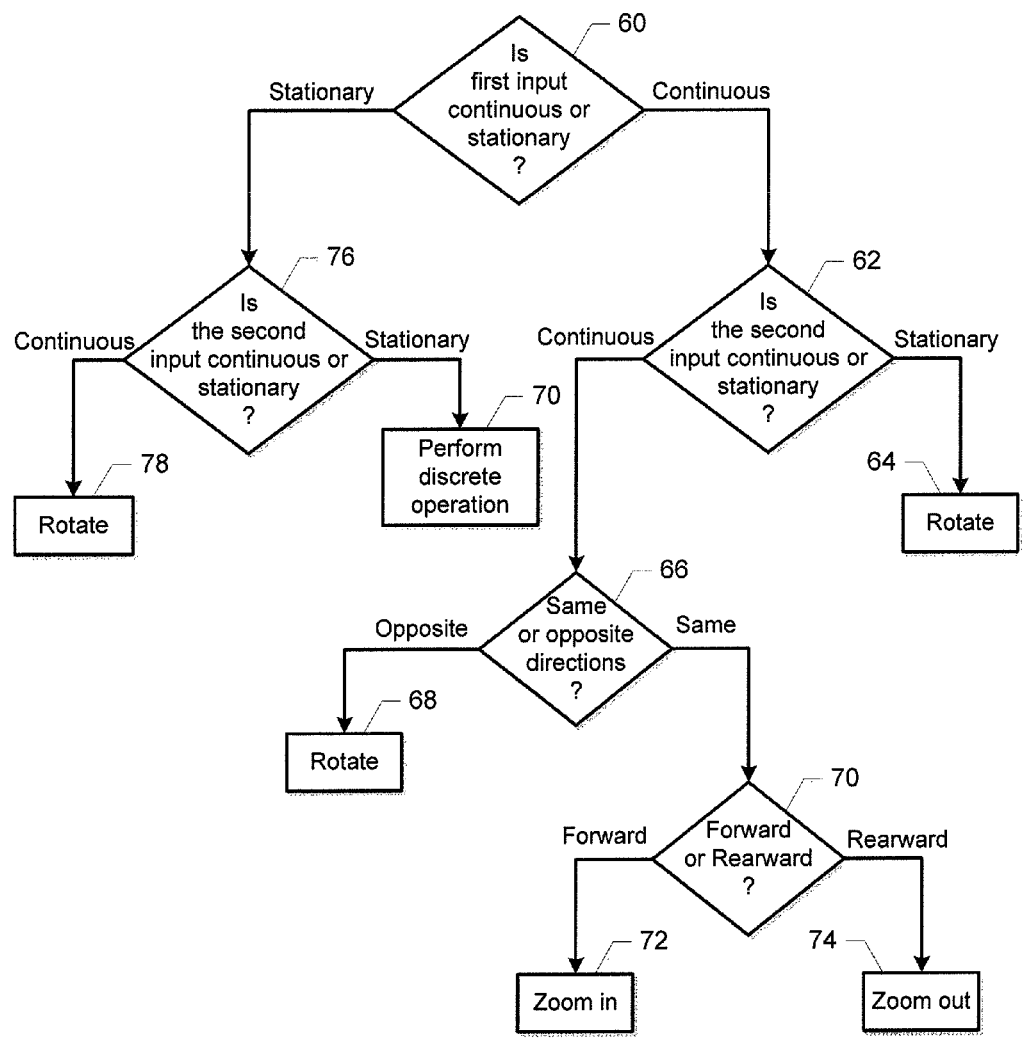

Having thus described certain embodiments of the invention in general terms, reference will now be made to the accompanying drawings, which are not necessarily drawn to scale, and wherein:

FIG. 1 is a perspective view of a head mounted display in accordance with an example embodiment of the present invention;

FIG. 2 is a block diagram of an apparatus that may be specifically configured in accordance with an example embodiment of the present invention;

FIG. 3 is a side view of a user's head illustrating several regions of the head;

FIG. 4 is a flowchart illustrating operations performed, such as by the apparatus of FIG. 2, in accordance with an example embodiment of the present invention; and FIG. 5 is a flowchart illustrating operations performed, such as by the apparatus of FIG. 2, in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided according to an example embodiment in order to permit a user to interact with a head mounted display and, more particularly, with information presented by the head mounted display. A method, apparatus and computer program product are provided in one embodiment to allow for rich interaction with the information presented by the head mounted display, thereby allowing the user to provide a wide variety of instructions and to correspondingly cause a wide variety of operations to be performed with respect to the information presented by the head mounted display. In one embodiment, the method, apparatus and computer program product are responsive to input, such as a stationary selection and/or a continuously moving input, provided to first and second touch sensors positioned upon portions of the head mounted display that are located on opposite sides of the user's head. As a result, the input may be relatively intuitive in at least some embodiments.

A head mounted display 10 permits a user to optically view a scene external to the head mounted display. With reference to FIG. 1 by way of example, a head mounted display may be in the form of a pair of glasses having a pair of lenses, e.g., a right lens 12 and a left lens 14, and a pair of side stems, e.g., a right side stem 16 and a left side stem 18, configured to support the glasses upon the user's ears. The first and second side stems are configured to be positioned upon opposite sides of the user's head once a user has donned the glasses. The glasses may be worn by the user such that the user may view a scene, e.g., a field of view, through the lenses of the glasses. However, the glasses may also be configured to present a visual representation of other information so as to augment or supplement the user's view of the scene through the lenses of the glasses. In the illustrated embodiment, for example, the information may be presented upon the lenses as shown generally by region 20 in FIG. 1. The information presented by the head mounted display may augment the objects in the scene viewed through the head mounted display, such as by identifying or otherwise providing more information regarding one or more of the objects viewed through the head mounted display. Alternatively, the information presented by the head mounted display may be unrelated to the objects in the scene viewed through the head mounted display, but may otherwise provide information that may be of interest to the user. Regardless of the type of information presented by the head mounted display, a head mounted display as exemplified by the glasses may support augmented reality and other applications.

While augmented reality glasses are one example of a head mounted display 10, a head mounted display may be embodied in a number of different manners with a variety of form factors, each of which may permit a user to optically see through the display so as to view the user's surroundings and each of which may benefit from the method, apparatus and computer program product of an example embodiment of the present invention as described below. For example, the head mounted display may be in the form of a head mounted visor or a helmet manner display. For example, the head mounted display may be in a form of a helmet worn by a motorcyclist, a pilot or they like.

In accordance with an example embodiment of the present invention, an apparatus 30 is associated with the head mounted display 10 in order to receive user input and to cause the like for enabling the apparatus 30 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 30 may be embodied by a computing device, such as a head mounted display 10 or a computing device in communication with the head mounted display, configured to employ an example embodiment of the present invention. However, in some embodiments, the apparatus may be embodied as a chip or chip set. In other words, the apparatus may comprise one or more physical packages (e.g., chips) including materials, components and/ or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 32 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 32 may be configured to execute instructions stored in the memory device 34 or otherwise accessible to the processor. Alternatively or additionally, the processor may be configured to execute hard coded functionality. As such, whether configured by hardware or software methods, or by a combination thereof, the processor may represent an entity (e.g., physically embodied in performance of an operation by the head mounted display in response to the user input. In one embodiment, the apparatus may be embodied by the head mounted display. Alternatively, the apparatus may be embodied by a computing device that is remote from the head mounted display, but that is in communication therewith, such as via wireless communication, e.g., via Bluetooth communication, Wi-Fi or another wireless network, or via wired communication. For example, a computing device, such as a portable digital assistant (PDA), mobile telephone, smartphone, pager, mobile television, gaming device, laptop computer, camera, tablet computer, touch surface, video recorder, audio/video player, radio, electronic book, positioning device (e.g., global positioning system (GPS) device), or any combination of the aforementioned, and other types of voice and text communications systems, may embody the apparatus of one embodiment so as to receive and process the user input and to cause the head mounted display to perform an operation in response thereto. In this embodiment, the computing device that embodies the apparatus may then provide direction to another computing device, such as a head mounted display, to which the user is providing input.

Regardless of its implementation, the apparatus 30 may include or otherwise be in communication with a processor 32, a memory device 34 and a communication interface 36. It should be noted that while FIG. 2 illustrates one example of a configuration of an apparatus for receiving and responding to user input, numerous other configurations may also be used to implement embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 32 (and/or co-processors or any other processing circuitry assisting or otherwise associated with the processor) may be in communication with the memory device 34 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 36 may be any means such as a device or circuitry embodied in either hardware or a combination of hardware and software that is configured to receive and/or transmit data from/to a head mounted display 10, such as a computing device embodied by the head mounted display, in an embodiment in which the apparatus 30 is remote from the head mounted display. As described below, for example, the head mounted display may include first and second touch sensors 22, 24 and the communication interface may be configured to communicate with the first and second touch sensors to receive sensor information indicative of the user input provided via the touch sensors. As a further example, the head mounted display may include a display 38 and the communication interface may be configured to direct the presentation of information upon the display. Additionally, the communication interface may be configured to communicate with other components of the computing device in an instance in which the apparatus is embodied by a computing device embodied by the head mounted display or with a remote computing device in an instance in which the apparatus is separate from the head mounted display.

In this regard, the communication interface 36 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the sensor(s) 18, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device including, for example, other components of the head mounted display 10 in an embodiment in which the apparatus 30 is embodied by the head mounted display.

As described in detail below and as shown in FIG. 2, the apparatus 30 may receive first and second inputs from first and second touch sensors 22, 24, respectively, which are responsive to the user's touch. The first touch sensor is positioned on a first portion of a head mounted display 10 and the second touch sensor is positioned on the second portion of the head mounted display. The first and second portions of the head mounted display upon which the first and second touch sensors, respectively, are positioned are opposite one another with respect to the user's head, such as by being on opposite sides of the user's head. In the embodiment in which the head mounted display has the form of a pair of eyeglasses, the first touch sensor may be positioned upon the first side stem 16 and the second touch sensor may be positioned upon the second side stem 18. Alternatively, in an embodiment in which the head mounted display is in a form of a helmet, the first touch sensor may be positioned upon one side of the helmet, such as along the jaw line on the right side of the helmet, and the second touch sensor may be positioned upon the opposite side of the helmet, such as along the jawline on the left side of the helmet.

Regardless of the form of the head mounted display 10, the first and second touch sensors 22, 24 are carried by the head mounted display so as to be on opposite side of the user's head once the user has donned the head mounted display. With reference to FIG. 3, for example, the first touch sensor may be positioned upon a first portion of the head mounted display that is positioned proximate to the regio temporalis 40, the regio zygomatica 42, the regio parotideomasscterica 44 or the regio buccalis 46 on the first side of the user's head. Conversely, the second touch sensor may be positioned upon the second portion of the head mounted display that is positioned proximate to the regio temporalis, the regio zygomatica, the regio parotideomasscterica or the regio buccalis on the second side of the user's head, opposite the first side of the user's head.

Although the first touch sensor 22 and the second touch sensor 24 are shown to be single sensors, the first touch sensor may be embodied by a plurality of sensors positioned along the first portion of the head mounted display 10 and/or the second touch sensor may be embodied by a plurality of sensors positioned along the second portion of the head mounted display. As such, the first and/or second touch sensors of this embodiment may define a plurality of touch sensitive regions along the first and second portions, respectively, of the head mounted display. In this embodiment, the plurality of touch sensitive regions may be utilized to detect an input representative of continuous movement or to detect different types of discrete inputs. In one embodiment, the plurality of touch sensitive regions are positioned so as to be adjacent one another, thereby forming a continuous touch sensor comprised of the plurality of adjacently positioned touch sensitive regions.

Referring now to FIG. 4, the operations performed, such as by the apparatus 10 of FIG. 2, in accordance with an example embodiment of the present invention are illustrated. As shown by block 50 of FIG. 4, the apparatus may be configured to receive a first input from a first touch sensor 22 positioned upon a first portion of the head mounted display 10. As described below, the first touch sensor may be a discrete touch sensor positioned at a particular location or a continuous touch sensor positioned along a length of the first portion of the head mounted display. As such, the apparatus may include means for receiving the first input from the first touch sensor. For example, the processor 32, the communication interface 36 or the like may comprise the means for receiving the first input from the first touch sensor.

Similarly, the apparatus 10 may be configured to receive a second input from a second touch sensor 24 positioned upon a second portion of the head mounted display 10. See block 52 of FIG. 4. As described above, the second portion of the head mounted display may be configured to be opposite the first portion of the head mounted display relative to the user's head once the user has donned the head mounted display. As with the first touch sensor, the second touch sensor may be a discrete touch sensor positioned at a particular location or a continuous touch sensor positioned so as to extend along a length of the second portion of the head mounted display. The first and second touch sensors may be of the same type, such as by both being discrete touch sensors or both being continuous touch sensors, or the first and second touch sensors may be different types of touch sensors with one of the first and second touch sensors being a discrete touch sensor and the other one of the first and second touch sensors being a continuous touch sensor. Regardless of its configuration, the apparatus of this embodiment includes means from receiving the second input from the second touch sensor. For example, the processor 32, the communication interface 36 or the like may comprise the means for receiving the second input from the second touch sensor.

The apparatus 30, such as the processor 32, may be configured in one embodiment to require the first and second inputs to be received concurrently. In an alternative embodiment, the apparatus, such as the processor, may permit the first and second inputs to be received at different times, such as in a sequential fashion. For example, the apparatus, such as the processor, of one embodiment may require the first and second inputs to be received within a predefined period of time of one another in order to be considered in combination. In other words, the apparatus, such as the processor, of this embodiment, may require a subsequent touch input to be received within the predefined period of time of an initial touch input.

As shown in block 54 of FIG. 4, the apparatus 30 may also be configured to cause the performance of an operation related to the head mounted display 10 based upon a combination of both the first and second inputs. In this regard the apparatus may include means for causing the performance of an operation related to the head mounted display based upon a combination of both the first and second inputs. For example, the processor 32 or the like may comprise the means for causing performance of an operation related to the head mounted display based upon a combination of both the first and the second inputs. Various operations may be performed by the head mounted display, such as by performing various operations upon the information presented by the head mounted display, in response to a combination of both the first and second inputs. For example, an image presented by the head mounted display may be zoomed, rotated, deformed, e.g., stretched, compressed, skewed or the like, panned or the like. In this regard, an image may include any subpart of an image or any object presented within an image. Moreover, an image not only includes a picture, but also any other visual representation presented by the head mounted displaying including, for example, text, icons, etc. Other operations may be performed based upon the combination of first and second inputs including, for example, playing, pausing, stopping, fast forwarding or rewinding an audio and/or a video file, scrolling, capturing an image, posting an image or other information to a website, a social media account or the like, adjusting the volume, controlling a mouse, selecting an option or the like.

Reference will now made to FIG. 5 in which certain examples of operations that may be caused to be performed by the head mounted display 10 based upon a combination of both the first and second inputs are illustrated. However, these particular operations are provided by way of example and not of limitation. In this embodiment, various operations may be performed by the head mounted display based upon different combinations of the first and second inputs, such as based upon different combinations of inputs in the form of a continuous movement in a respective direction or a stationary selection.

A continuous movement may be any movement in which the user continuously touches a touch sensor while moving their touch from a first position on the touch sensor to a second position, displaced from the first position, on the touch sensor. While the movement may be continuous from the first position to the second position in that the movement proceeds in a continuously moving, uninterrupted fashion, a continuous movement also includes a movement that is intermittent such that the touch does not move always move from the first position. Instead, a continuous movement may include a movement that begins with a touch at the first position and then moves along the touch sensor, but which may stop one or more times and, indeed, may temporarily reverse in direction, prior to reaching the second position at which point the touch is completed by being lifted from the touch sensor. Even though the movement may be intermittent or discontinuous, the touch remains continuous with the touch sensor and is not lifted from the touch sensor after initially touching the touch sensor at the first position until the touch reaches the second position and is lifted from the touch sensor.

Additionally, a stationary selection may be effected by the user's touch of a touch sensor in which the user both initially contacts the touch sensor and then subsequently breaks contact with the touch sensor, such as by lifting the touch from the touch sensor, at the same position upon the touch sensor. Although the stationary selection typically does not involve movement of the touch between the initial contact and the subsequent break in contact with the touch sensor, a stationary selection may also include a touch that is be moved along the touch sensor following the initial touch so long as the touch returns to the same position upon the touch sensor that was initially touched at the time of breaking contact with the touch sensor.

With reference to block 60 of FIG. 5 and as may be determined by the processor 32, the first input may be representative of continuous movement on the first portion of the head mounted display 10 or may be representative of a stationary selection upon the first portion of the head mounted display. In an instance in which the first input is representative of continuous movement along the first portion of head mounted display, block 62 of FIG. 5 indicates that the second input may similarly be either representative of a continuous movement along the second portion of the head mounted display or may be representative of a stationary selection upon the second portion of the head mounted display. In an instance in which the second input is determined, such as by the processor, to be representative of a stationary selection on the second portion of the head mounted display, the apparatus 30, such as the processor or the like, may cause rotation of an image presented by the head mounted display in a direction that may be dependent upon the direction of the continuous movement provide by the first input. See block 64.

However, in an instance in which the second input is also representative of a continuous movement along the second portion of the head mounted display 10, the apparatus 30, such as the processor 32 or the like, may compare the directions of the continuous movement of the first and second inputs. See block 66. In an instance in which the first and second inputs are both continuously moving in the same direction, e.g., both moving forwardly or both moving rearwardly, along the first and second portions, respectively, of the head mounted display, the apparatus, such as the processor or the like, may be configured to cause zooming of an image presented by the head mounted display. See block 70. The extent of the zooming may be based upon the length of the continuous movements provided by the first and second inputs with greater zooming being provided for longer continuous movements and lesser zooming being provided for shorter continuous movements. For example, in an instance in which the first and second inputs are both representative of a continuous movement in a forward direction relative to the user's head, the apparatus, such as the processor, may cause zooming in of the image presented by the head mounted display. See block 72. In this regard, the zooming in of an image may increase the magnification of the image such that at least portions of the image are shown in more detail. Conversely, in an instance in which the first and second inputs are both representative of a continuous movement in a rearward direction relative to the user's head, the apparatus, such as a processor, may cause the performance of a zooming out of an image presented by the head mounted display. See block 74. In this regard, the zooming out of an image may decrease the magnification of the image. While one example is provided above, the zooming out and the zooming in of an image may be caused by first and second inputs having continuous movements in a different direction, such as by causing the performance of a zooming out of an image in response to the first and second inputs both being representative of a continuous movement in a forward direction and by causing the performance of a zooming in of an image in response to the first and second inputs both being representative of a continuous movement in a rearward direction. However, in an instance in which the second input is determined, such as by the processor, to be representative of a continuous movement in a second direction along the second portion of the head mounted display, opposite the first direction in which the first input is determined to have moved along the first portion of the head mounted display, the apparatus, such as the processor, may cause rotation of the image presented by the head mounted display. See block 68.

As noted in blocks 64 and 68 of FIG. 5, the apparatus 30, such as the processor 32, may cause rotation of the image presented by the head mounted display 10 both in response to the second input being representative of a stationary selection and in response to the second input being representative of a continuous movement in an opposite direction from the first input. However, the amount or extent of the rotation may differ in these two instances. For example, the apparatus, such as the processor, may cause the image presented by the head mounted display to be rotated to a greater degree in an instance in which the second input is representative of a continuous movement in the second direction, opposite the first direction, than in an instance in which the second input is representative of a stationary selection. Further, the direction of rotation may be defined by the direction in which the first input and, in some embodiments, the second input continuously move along the respective portions of the head mounted display. For example, the apparatus, such as the processor, may be configured to cause the image presented by the head mounted display to be rotated in a clockwise direction in response to the first input being representative of a continuous movement in a first direction along the first portion of the head mounted display and to be rotated in counterclockwise direction in an instance in which the first input is representative of a continuous movement in a second direction, opposite the first direction, along the first portion of the head mounted display. In other embodiments, however, the image may be rotated about other axes, such as an x axis, a y axis, a z axis or any other axis.

As shown in FIG. 5, in an instance in which the first input is representative of a stationary selection upon the first portion of the head mounted display 10, the apparatus 30, such as the processor 32, may determine whether the secondary input is representative of a stationary selection or a continuous movement. See block 76. In an instance in which the second input is representative of a continuous movement along the second portion of the head mounted display, the apparatus, such as the processor, may cause the image presented by the head mounted display to be rotated. See block 78. In this regard, the apparatus, such as the processor, may be configured to cause the image to be rotated in a direction defined by the direction in which the second input continuously moves along the second portion of the head mounted display. For example, the apparatus, such as the processor, may be configured to cause the image presented by the head mounted display to be rotated in a clockwise direction in response to the second input being representative of a continuous movement in a first direction along the second portion of the head mounted display and to be rotated in counterclockwise direction in an instance in which the second input is representative of a continuous movement in a second direction, opposite the first direction, along the second portion of the head mounted display. Still further, in an instance in which both the first and second inputs are representative of stationary selections on the first and second portions, respectively, of the head mounted display, the apparatus, such as the processor, may cause performance of another operation, such as a discrete operation. See block 80.

In one embodiment, the operation that is caused to be performed may be the deformation of a selected image, such as a selected object within the image, presented by the head mounted display 10, such as by stretching, compressing or skewing the image. In this embodiment, the apparatus 30, such as the processor 32, may cause deformation of the image presented by the head mounted display based upon a combination of both the first and second inputs. For example, the apparatus, such as the processor, may cause deformation of an image by modifying one portion of the image based upon the first input and by modifying another portion of the image based upon the second input. For example, the apparatus, such as the processor, may modify the portion of an image that is positioned on the same side of the head mounted display as the first portion of the head mounted display based upon the first input and may cause another portion of the image that is positioned on the same side of the head mounted display as the second portion of the head mounted display to be modified based upon the second input. In this regard, both portions of the image may be modified in the same manner or in different manners depending upon the first and second inputs, such as depending upon whether the first and second inputs are the same or different from one another.

The apparatus 30, such as the processor 32, of one embodiment may combine the first and second inputs provided via the first and second touch sensors 22, 24 with information provided by one or more other sensors carried by or associated with the head mounted display 10 which may, for example, track the location and orientation of the user's head. For example, a head mounted display may include a tilt sensor. Thus, the apparatus, such as the processor, of this embodiment may provide macro level control via the first and second touch sensors with more fine level control provided via the tilt sensor in response to the tilt of the user's head. By way of example, the image presented by the head mounted display may be zoomed in or zoomed out in response to first and second inputs provided via the first and second touch sensors. By the user tilting their head, information regarding the tilt of the user's head may be provided by the tilt sensor such that the apparatus, e.g., the processor, may more finely control the zooming of the image in response to the tilt of the user's head. Similar control could be provided in conjunction with other operations, such as deformation, by combining the first and second inputs with information provided by other sensors carried by or associated with the head mounted display.

Although a number of operations that may be performed based upon a combination of first and second inputs have been described above, these operations have been described by way of example and other types of operations related to the head mounted display 10 may be performed based upon a combination of first and second inputs in other embodiments. For example, the apparatus 30, such as the processor 32, may receive a first input representative of the user having tapped and held the first touch sensor in order to expand a menu or to otherwise expand a list of available options. In this embodiment, the apparatus, such as the processor, may also receive a second input representative of the user tapping the second touch sensor in order to select one of the expanded options. As used herein, an input received by the apparatus that is representative of a certain action taken by the user may be one or more signals that are provided to the apparatus by a sensor, such as the first or second touch sensors, in response to the action taken by the user. As another example, the apparatus, such as the processor, may receive a first input representative of the user having tapped the first touch sensor in order to cause an image to be captured. In this embodiment, the apparatus, such as the processor, may also be configured to receive a second input representative of a continuous movement along the second portion of the head mounted display in order to direct that the image that has been captured is to be posted. For example, the image may be posted to different social media sites depending upon the direction of the continuous movement of the second input, such as by posting the image that was captured to Facebook in response to the continuous movement in one direction and by causing the image that was captured to be posted to Twitter in response to continuous movement in the opposite direction.

Further, the apparatus 30, such as the processor 32, may be configured to receive the first input representative of a continuous movement along the first portion of the head mounted display 10 and to cause the volume of an audio file that is currently being played to be adjusted based thereupon. For example, the volume may be increased or decreased depending upon the direction of the continuous movement along the first portion of head mounted display. Additionally or alternatively, the apparatus, such as the processor, may be configured to receive a second input representative of a continuous movement along the second portion of the head mounted display and to cause the audio or video file that is currently being played to be fast forwarded or rewound depending upon the direction of the continuous movement. In another embodiment, the apparatus, such as the processor, may be configured to receive the first and second inputs via the first and second touch sensors, respectively, and to interpret the first and second inputs to be indicative of an intended direction of movement of a cursor presented upon the head mounted display. For example, the first input may be representative of a continuous movement along the first portion to the head mounted display which may cause the representation of the cursor to move to the right or to the left based upon the direction of the continuous movement, while the second input may be representative of a continuous movement along the second portion of head mounted display which may cause the representation of the cursor to move up and down depending upon the direction of the second input.

As described above, the method, apparatus and computer program product of an example embodiment are configured to permit a user to interact more richly with a head mounted display 10, such as with the information presented by a head mounted display. In this regard, the method, apparatus and computer program product of one embodiment may receive first and second inputs via first and second portions of the head mounted display that are positioned on opposite sides of the user's head with the first and second inputs being relatively intuitive so as to facilitate user interaction with the head mounted display.

As described above, FIGS. 4 and 5 illustrate flowcharts of an apparatus, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 34 of an apparatus 30 employing an embodiment of the present invention and executed by a processor 32 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    receiving a first input from a first touch sensor positioned upon a first side stem of a head mounted display and configured to receive the first input representative of either a continuous movement or a stationary selection;
    receiving a second input from a second touch sensor positioned upon a second side stem of the head mounted display and configured to receive the second input representative of either a continuous movement or a stationary selection, wherein the second side stem of the head mounted display is configured to be opposite the first side stem relative to a user's head with one of the first and second side stems configured to be on a left side of the user's head and the other of the first and second side stems is configured to be on a right side of the user's head such that the first and second side stems of the head mounted display are configured to receive the user's head therebetween; and
    causing, with a processor, performance of an operation related to the head mounted display based upon a combination of both the first and second inputs, wherein the operation that is caused to be performed is determined in a manner dependent upon the combination of both the first and second inputs such that both the first and second inputs must be received in order to cause performance of the operation.

2. A method according to claim 1 wherein at least one of receiving the first input or receiving the second input comprises receiving an input representative of a continuous movement along a respective side stem of the head mounted display.

3. A method according to claim 1 wherein receiving the first input comprises receiving an input representative of a continuous movement in a first direction along the first side stem of the head mounted display, wherein receiving the second input comprises receiving an input representative of a continuous movement in the first direction along the second side stem of the head mounted display, and wherein causing performance of an operation comprises causing zooming of an image presented by the head mounted display.

4. A method according to claim 1 wherein receiving the first input comprises receiving an input representative of a continuous movement in a first direction along the first side stem of the head mounted display, wherein receiving the second input comprises receiving an input representative of a continuous movement in a second direction, opposite the first direction, along the second side stem of the head mounted display, and wherein causing performance of an operation comprises causing rotation of an image presented by the head mounted display.

5. A method according to claim 1 wherein receiving the first input comprises receiving an input representative of a stationary selection on the first side stem of the head mounted display, wherein receiving the second input comprises receiving an input representative of a continuous movement along the second side stem of the head mounted display, and wherein causing performance of an operation comprises causing rotation of an image presented by the head mounted display.

6. A method according to claim 1 wherein causing performance of an operation comprises causing deformation of an image presented by the head mounted display based upon the combination of both the first and second inputs.

7. A method according to claim 6 wherein causing deformation of the image presented by the head mounted display comprises modifying one portion of the image based upon the first input and modifying another portion of the image based upon the second input.

8. An apparatus comprising at least one processor and at least one memory including computer program code, the at least one memory and the computer program code configured to, with the processor, cause the apparatus to at least:
receive a first input from a first touch sensor positioned upon a first side stem of a head mounted display and configured to receive the first input representative of either a continuous movement or a stationary selection;
receive a second input from a second touch sensor positioned upon a second side stem of the head mounted display and configured to receive the second input representative of either a continuous movement or a stationary selection, wherein the second side stem of the head mounted display is configured to be opposite the first side stem relative to a user's head with one of the first and second side stems configured to be on a left side of the user's head and the other of the first and second side stems is configured to be on a right side of the user's head such that the first and second side stems of the head mounted display are configured to receive the user's head therebetween; and
cause performance of an operation related to the head mounted display based upon a combination of both the first and second inputs, wherein the operation that is caused to be performed is determined in a manner dependent upon the combination of both the first and second inputs such that both the first and second inputs must be received in order to cause performance of the operation.

9. An apparatus according to claim 8 wherein the at least one memory and the computer program code are configured to, with the processor, cause the apparatus to at least one of receive the first input or receive the second input by receiving an input representative of a continuous movement along a respective side stem of the head mounted display.

10. An apparatus according to claim 8 wherein the at least one memory and the computer program code are configured to, with the processor, cause the apparatus to receive the first input by receiving an input representative of a continuous movement in a first direction along the first side stem of the head mounted display, to receive the second input by receiving an input representative of a continuous movement in the first direction along the second side stem of the head mounted display, and to cause performance of an operation by causing zooming of an image presented by the head mounted display.

11. An apparatus according to claim 8 wherein the at least one memory and the computer program code are configured to, with the processor, cause the apparatus to receive the first input by receiving an input representative of a continuous movement in a first direction along the first side stem of the head mounted display, to receive the second input by receiving an input representative of a continuous movement in a second direction, opposite the first direction, along the second side stem of the head mounted display, and to cause performance of an operation by causing rotation of an image presented by the head mounted display.

12. An apparatus according to claim 8 wherein the at least one memory and the computer program code are configured to, with the processor, cause the apparatus to receive the first input by receiving an input representative of a stationary selection on the first side stem of the head mounted display, to receive the second input by receiving an input representative of a continuous movement along the second side stem of the head mounted display, and to cause performance of an operation by causing rotation of an image presented by the head mounted display.

13. An apparatus according to claim 8 wherein the at least one memory and the computer program code are configured to, with the processor, cause the apparatus to cause performance of an operation by causing deformation of an image presented by the head mounted display based upon the combination of both the first and second inputs.

14. An apparatus according to claim 13 wherein the at least one memory and the computer program code are configured to, with the processor, cause the apparatus to cause deformation of the image presented by the head mounted display by modifying one portion of the image based upon the first input and modifying another portion of the image based upon the second input.

15. A computer program product comprising at least one non-transitory computer-readable storage medium having computer-executable program code portions stored therein, the computer-executable program code portions comprising program code instructions for:
receiving a first input from a first touch sensor positioned upon a first side stem of a head mounted display and configured to receive the first input representative of either a continuous movement or a stationary selection;
receiving a second input from a second touch sensor positioned upon a second side stem of the head mounted display and configured to receive the second input representative of either a continuous movement or a stationary selection, wherein the second side stem of the head mounted display is configured to be opposite the first side stem relative to a user's head with one of the first and second side stems configured to be on a left side of the user's head and the other of the first and second side stems is configured to be on a right side of the user's head such that the first and second side stems of the head mounted display are configured to receive the user's head therebetween; and causing performance of an operation related to the head mounted display based upon a combination of both the first and second inputs, wherein the operation that is caused to be performed is determined in a manner dependent upon the combination of both the first and second inputs such that both the first and second inputs must be received in order to cause performance of the operation.

16. A computer program product according to claim 15 wherein at least one of the program code instructions for receiving the first input or the program code instructions for receiving the second input comprise program code instructions for receiving an input representative of a continuous movement along a respective side stem of the head mounted display.

17. A computer program product according to claim 15 wherein the program code instructions for receiving the first input comprise program code instructions for receiving an input representative of a continuous movement in a first direction along the first side stem of the head mounted display, wherein the program code instructions for receiving the second input comprise program code instructions for receiving an input representative of a continuous movement in the first direction along the second side stem of the head mounted display, and wherein the program code instructions for causing performance of an operation comprise program code instructions for causing zooming of an image presented by the head mounted display.

18. A computer program product according to claim 15 wherein the program code instructions for receiving the first input comprise program code instructions for receiving an input representative of a continuous movement in a first direction along the first side stem of the head mounted display, wherein the program code instructions for receiving the second input comprise program code instructions for receiving an input representative of a continuous movement in a second direction, opposite the first direction, along the second side stem of the head mounted display, and wherein the program code instructions for causing performance of an operation comprise program code instructions for causing rotation of an image presented by the head mounted display.

19. A computer program product according to claim 15 wherein the program code instructions for receiving the first input comprise program code instructions for receiving an input representative of a stationary selection on the first side stem of the head mounted display, wherein the program code instructions for receiving the second input comprise program code instructions for receiving an input representative of a continuous movement along the second side stem of the head mounted display, and wherein the program code instructions for causing performance of an operation comprise program code instructions for causing rotation of an image presented by the head mounted display.

20. A computer program product according to claim 15 wherein the program code instructions for causing performance of an operation comprise program code instructions for causing deformation of an image presented by the head mounted display based upon the combination of both the first and second inputs.

* * * * *